W. G. CHIPLEY.
RESILIENT WHEEL.
APPLICATION FILED JUNE 17, 1918.
1,315,091.
Patented Sept. 2, 1919.
4 SHEETS—SHEET 4.
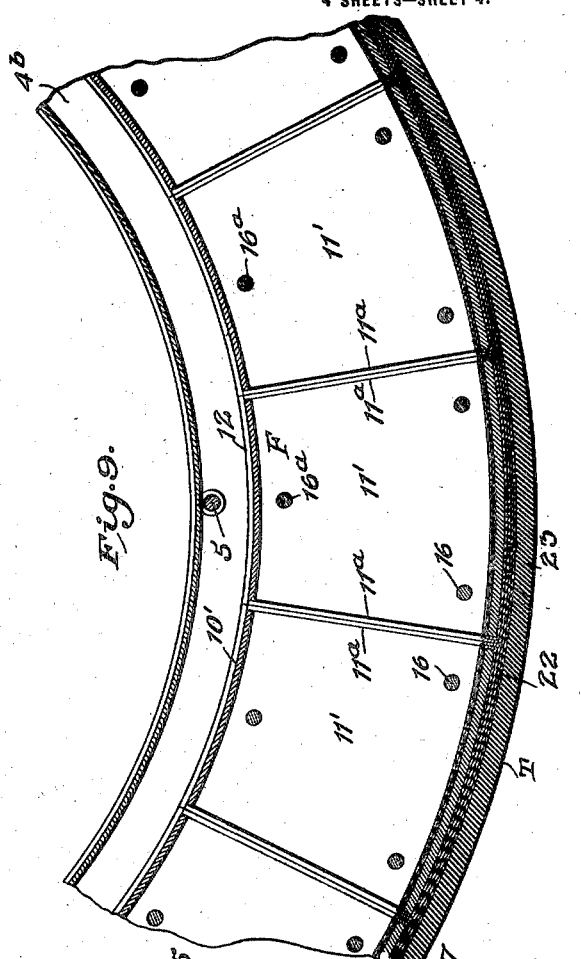
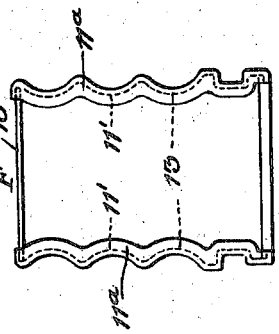
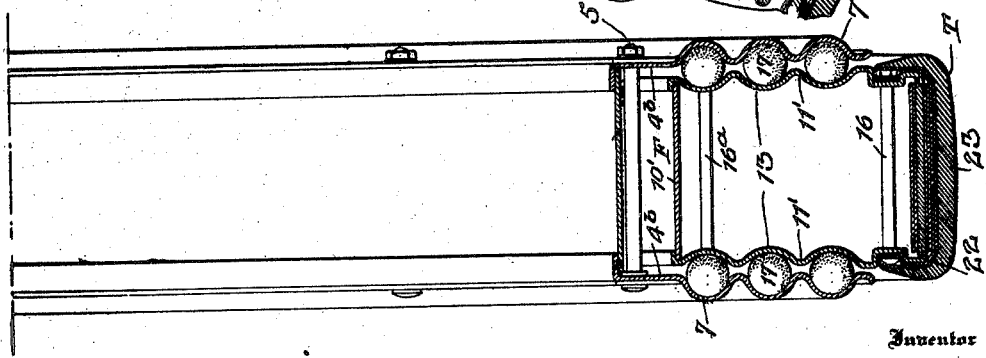
Inventor
William G. Chipley
By Mason Fenwick Lawrence,
Attorneys

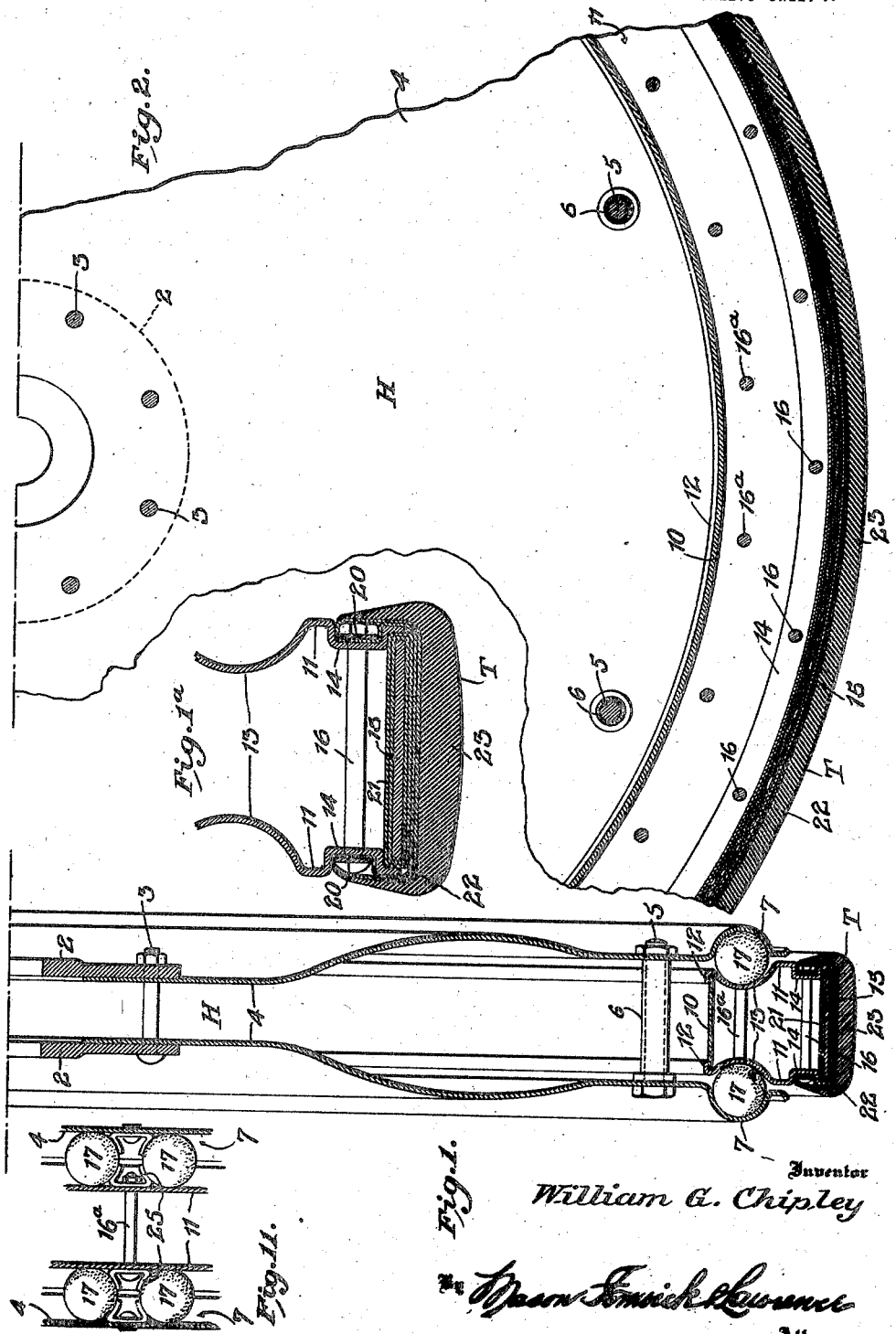

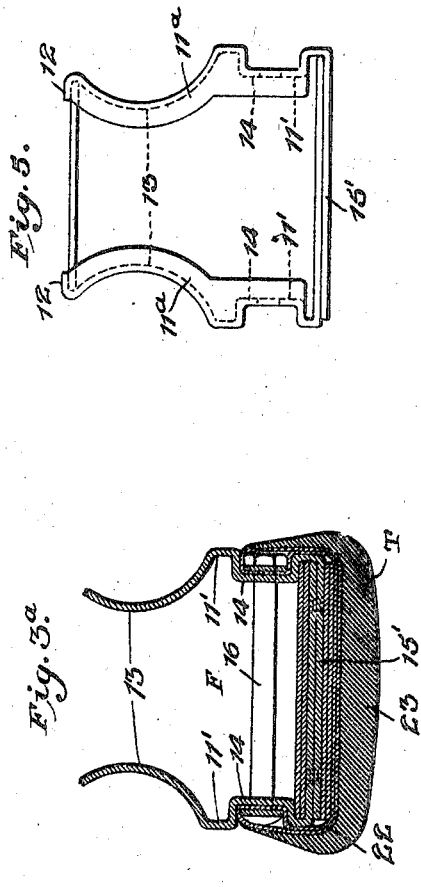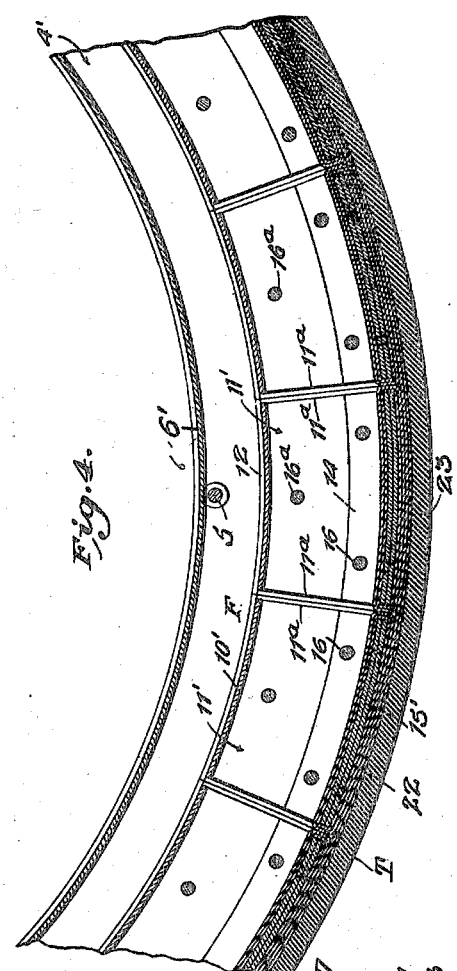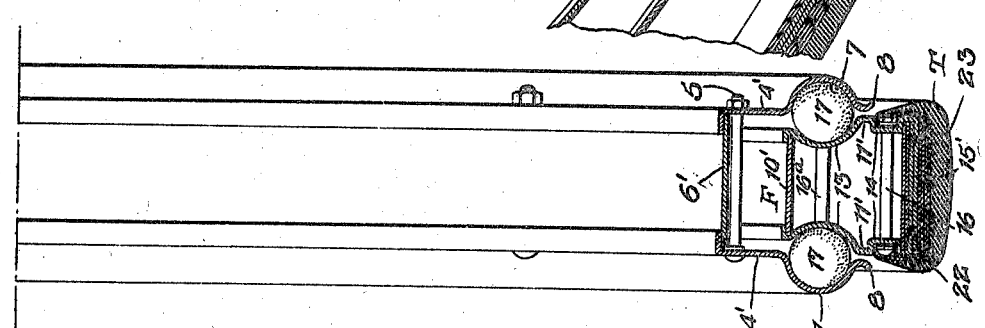

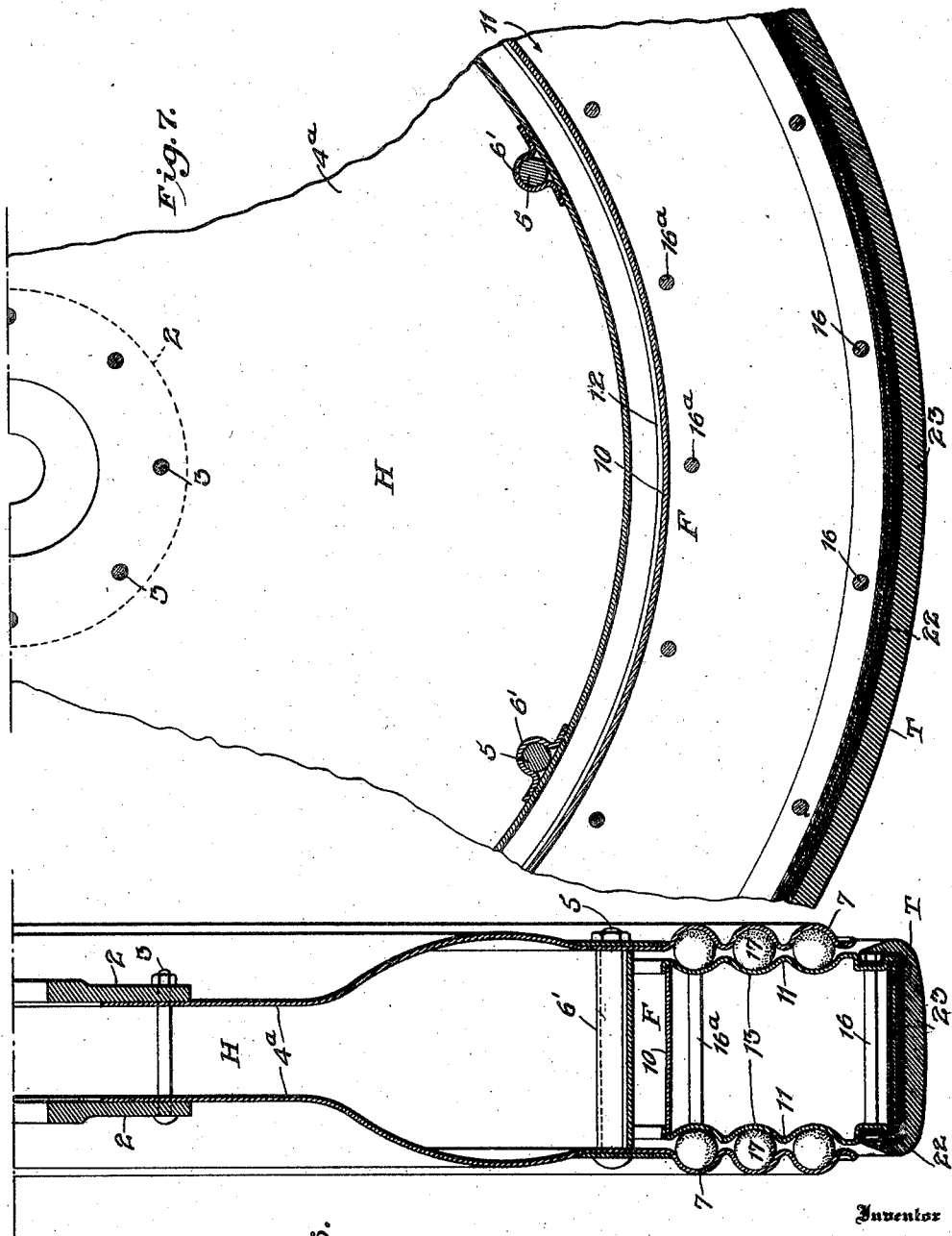

UNITED STATES PATENT OFFICE.

WILLIAM G. CHIPLEY, OF OMAHA, NEBRASKA.

RESILIENT WHEEL.

1,315,091.

Specification of Letters Patent. Patented Sept. 2, 1919.

Application filed June 17, 1918. Serial No. 240,534.

*To all whom it may concern:*

Be it known that I, WILLIAM G. CHIPLEY, a citizen of the United States, residing at Omaha, in the county of Douglas and State of Nebraska, have invented certain new and useful Improvements in Resilient Wheels; and I do hereby declare the following to be a full, clear, and exact description of the invention, such as will enable others skilled in the art to which it appertains to make and use the same.

This invention relates to resilient wheels, and particularly to the type of resilient wheel having a rigid body or hub structure encompassed by a rigid annular felly or ring which is provided with a comparatively thin noise-deadening tread or tire.

It is one of the objects of the present invention to provide a resilient wheel of such structure as to eliminate the use of heavy cushion and solid rubber or pneumatic tires, thereby not only conserving in the cost of rubber portion of the tire, but further eliminating the relative frequent renewals, mendings, replacements and readjustments so generally accompanying the use of rubber, and especially pneumatic tires.

It is one of the important objects of the present invention to provide a resilient wheel structure of simple construction, few parts of inexpensive character, and to provide a wheel of this type which will give the necessary and desired degree of relatively cushioned movement of the hub structure as to the felly of the wheel. It is a further object of the invention to provide in a resilient wheel for the ready renewal of such parts as may be ordinarily subjected to wear, with the least requirement of time and at a minimum expense as to the cost of the parts.

It is one of the more important objects of the present invention to provide a resilient wheel comprising relatively movable felly and hub members capable of sufficient radial movement to give the necessary resiliency and which is of such construction as to substantially eliminate friction due to sliding movement of the parts one upon the other and at the same time provide for a suitable degree of lateral change of position relatively as well as radial change of position, it being a further object to provide a cushioning means between the relatively movable hub and felly members which are so arranged, constructed and embedded in the wheel organization that at substantially all points circumferentially about the hub structure this means will serve to react as a cushion and resiliently upon the slightest radial movement of the felly as to the hub member. In other words, it is the object of the present invention to provide a resilient wheel in which the cushioning means is reactive against relative radial movement not only at that portion of the cushioning member which is interposed between the lower side of the wheel when the hub moves downwardly toward the felly, but also which reacts upon relative upward movement of the felly as it passes over the top of the hub of the wheel when in rolling action.

With the above and other objects in view as will be rendered manifest to those versed in the art, the invention consists in the construction, combination and in various details and organizations of the parts as is exemplified in the accompanying illustrations of various embodiments or adaptations of the invention, in which illustrations,—

Figure 1 is a transverse radial section of a portion of the wheel.

Fig. 2 is a side elevation of a fragment of the wheel shown in Fig. 1.

Fig. 3 is a modified form of the wheel shown in Figs. 1 and 2, in which the felly member is built up of a number of rigidly connected segments of an annulus.

Fig. 3ª is an enlarged detail of the tread in Fig. 3.

Fig. 4 is a partial side elevation and central longitudinal sectional view through the medial plane of the form of wheel shown in Fig. 3, showing a sectional felly.

Fig. 5 is an end view of one of the felly sections.

Fig. 6 is a radial sectional view transversely of a modified form of the wheel in which there is provided on each side of the felly a plurality of series of the cushioning means.

Fig. 1ª is an enlarged detail of the tread in Fig. 1.

Fig. 7 is a view of a fragment of the form of wheel shown in Fig. 6, being partly in longitudinal section and partly in elevation.

Fig. 8 is a radial section transversely of a modified form of the wheel shown in Fig. 6.

Fig. 9 is a longitudinal sectional view partly in elevation of the wheel shown in Fig. 8 illustrating the sectional structure of the felly.

Fig. 10 is an end view of one of the felly sections shown in Fig. 9.

Fig. 11 is a detail view of the drive shoulders.

Throughout the several views there is shown a central and rigid body or hub structure in each of which views it is generally designated by the reference character H and also an annular tire structure generally indicated by the character T, and which latter includes a felly generally designated as F.

In the form of the wheel generally illustrated in Figs. 1 and 2, the hub structure comprises central disks 2 shown as bolted or otherwise rigidly connected at 3 to the adjacent portions of respective disks or walls 4 which are spaced apart and rigidly connected by an outer series of transverse spacing devices including bolts 5 adapted to draw the disks 4 against interposed spacing sleeves 6 mounted on the bolts between the disks 4. In Figs. 3 and 4 the hub structure H is somewhat modified in form as incorporating instead of solid disks 4 a pair of flanges 4′ which are spaced by a body ring 6′ shown as resting upon inturned shoulders of the flanges 4′, these latter being secured against the body of the ring 6′ by bolts 5. The outer portions of the disk 4 of Fig. 1 and the flanges 4′ of Fig. 3 are each provided with concavo convex annular seats or channels 7 of suitable radius of curve, the extreme edges of these members being turned outwardly beyond the seats 7 as at 8.

The felly of the wheel is shown in Figs. 1 and 2 as comprising a felly band 10 of such diameter that when the felly is introduced between the spaced seats 7 the band will occupy a position substantially transversely in line with the junction of the seats with the flat portion of the respective hub members 4—4 or 4′—4′. Overlapping the side edges of the felly band 10 are provided side elements 11—11 inwardly flanged at 12—12 to form shallow and acute seats to embrace the edges of the band 10 and outwardly beyond which seats are provided concavo convex channels or seats extending peripherally about the members 11—11 and designated at 13—13, these seats 13—13 when the felly member F is interposed between the seats 7—7 of the hub structure, assuming a position substantially when the wheel parts are concentric, opposite the seats 7—7. The felly elements 11—11 are in the form of complete rings in the embodiment of the invention shown in Figs. 1 and 2, these rings being provided with rabbets 14—14 beyond the concave seats 13 and the edges of the rings or elements 11—11 are adapted to be clenched against an annular tread ring 15 and rigidly secured thereto by suitable means shown as comprising bolts 16, the head of one end and the nut at the other end of which are countersunk in the rabbets 14. The desired resiliency and cushioning effect between the hub structure H and the felly structure F as above described is secured by interposing between opposed seats 7 and 13 on each side of the felly a cushioning means of such character as to act resiliently to absorb the shocks imparted to the relatively movable hub and felly when the wheel is in use. While I may use various means for securing this desired resiliency upon relatively radial movement, I prefer to use resilient compressible members one form of which is illustrated as comprising rubber balls 17 which are slightly larger in diameter than the normal space between the opposed respective seats 7 and 13 formed between the outer portion of the hub members 4 and 4′ and the adjacent seat portions 13 of the felly. In other words, in the assembly of the wheel a series of the cushioning balls 10 is interposed between opposed seats on one side of the felly and then the other series on the opposite side is adjusted in position upon the felly and then the respective hub forming member 4 or 4′ is placed against the latter series and both series are placed under suitable compression by the tightening up of the fastening bolts 5, this resulting in producing a normal state of reaction or compression between the cushioning devices 17 so that the unloaded hub and felly will assume relatively concentric relation. Upon the hub or the felly being subjected to pressure with respect to each other, there will be a tendency for relative radial movement of these two elements whereupon the entire series of supporting devices 17 will become compressed by the relative rolling action thereof in their concaved seats, this action placing these members under compression, the resiliency of the devices reacting to absorb the shock and return the members of the wheel to a normal concentric position.

The forms of the invention illustrated in Figs. 1 and 2; and 3, 4 and 5, differ not only in respect to the construction of the hub members, but also in respect to the construction of the felly members F, and in the modification shown in Figs. 3, 4 and 5, the felly member instead of being constructed of a pair of annular integral side rings 11 are shown as divided into a number of segments of annulus as clearly shown in Fig. 4, these segments comprising short pieces of felly band members 10′ and short sections of tread member 15′ and corresponding short pieces of side rings 11′, the latter of which are shown in Fig. 5 as being provided with inturned end flanges 11ª which are abutted against each other as shown in Fig. 4 in the completed felly. The side members of the felly are rabbeted as at 14 similar to the rabbets 14 of Fig. 4, and the fastening bolts 16 are passed through flat annular hoops 20 which therefore form a key on each side of the felly structure to compress the fabric forming the core for a tread described below.

It is desirable obviously to encompass the felly in a suitable easily renewed wear-taking and sound-deadening tread, and this I form in Fig. 1 by winding the tread member 15 with one or more plies of a suitable fabric or other material 21 before this tread member 15 is interposed between the lips of the felly rings 11. After the tread member 15 has been interposed between the lips of the felly rings 11 it is then overlapped with a rubberized layer 22 preferably of fabric, which is carried up over the lips of the felly members 11 and down into the rabbets 14 thereof and then the fastening bolts 16 are passed through the layer of fabric, the hoops 20, the felly member and the bolts tightened up to clench the tread ring 15 securely *in situ*, after which the edges 22 are returned over the ends of the bolt and over the layer of the fabric on the tread member 15 when the whole of the fabric structure may be vulcanized or otherwise suitably embedded in an exterior tread or tire layer 23. In the form of the invention shown in Figs. 3 and 4 owing to the different method of constructing the felly wrappings 21 are laid around each of the tread sections 15 of the segments of the felly, the segments being then assembled in position and the outer fabric 22 being laid over the felly in the same manner as described relative to Fig. 1, after which the hoops 20 are laid over that portion of the fabric 22 which lies in the rabbets 14 and the bolts 16 then inserted and tightened up and the edges of the fabric being returned over the perimeter of the felly and finally embedded in a vulcanized coating or tread 23. The subject matter of this paragraph is illustrated in my co-pending application, Serial Number 240535 filed June 17, 1918.

In the form of the invention shown in Figs. 1 and 3 I have illustrated the utilization of but a single organization or arrangement of the cushioning devices on each side of the felly F, but it is obvious that I may utilize a plurality of series of the cushioning device as rubber balls 17 between the sides of the felly and the overlapping seat portions of the hubs. In Figs. 6 and 8 the hub disks 4ª and hub rings 4ᵇ are shown as provided with a series of concavo convex and concentrically arranged seats 7 in opposition to similar seats 10 formed in the side members 11 of the felly structures of Figs. 6 and 8. As I have utilized a plurality of series of the cushion members 17 on each side of the felly in Figs. 6 and 8, I prefer to reduce the size of the resilient air cushioning balls between the felly and the hub elements.

It will be noticed that I form the seats 10 of the felly members of greater radius than the seats 7 of the opposed hub members, and that the balls 17 are approximately of the same radius as the radius of the seats 7, so that the balls have greater friction in the seats of the hub members than in the seats 10 of the felly and will therefore relatively move with the hubs and will roll or rock upon the felly seats. Manifestly, I may resort to various modifications, alterations and variants in constructions of the wheels without being limited to those shown herein and still within the scope and principle of my invention, and obviously I may utilize any desirable form or method of constructing, of tread tires.

It will be readily apparent that in the operation of the wheel when the felly is resting at any point upon a relatively stationary support and a load applied to the hub, there will be a relative change of position of the hub and felly and this will result in a relative compression of the interposed resilient and shock absorbing members or balls 17 at every point where there is local contact between the compressed balls and their respective seats 7 and 10. Not only will that portion of the shock absorbing means which is disposed between that portion of the hub and felly which move relatively toward each other be subjected to compression and resiliently react to take the shock, but also that portion of the cushion which is disposed between the portion of the hub and felly which move apart relatively will be subjected to compression and therefore utilized to resiliently absorb the shock.

While the cushioning members are here shown as solid rubber balls or suitable shaped cushioning devices, it is obvious that hollow rubber balls may be utilized in their stead so that air could be employed as a cushion.

In Fig. 11, one of a series of inner transverse rim fastening bolts 16ª is shown as passed through the side rings 11 at the zone of the seats 13, these not only clamping the rings 11 on the felly band 10 but also serve as means for securing shoulder forming clips 25 between its head and nut, these clips serving to prevent circumferential movement of the cushioning devices 17 of the felly with relation to the hub structure. The shoulders or clips 25 engage the adjacent sides of balls 17, and these latter are engaged on the opposite side by an outer series of clips 25 elevated or otherwise suitably secured in the seats 7 of the hub member.

Manifestly the cushioning devices 17 may assume the form of balls or spherical members, or if desired they may be made of any other shape as may be deemed necessary according to the design and construction and operation of the parts. From this arrangement of felly and hub members with interposed series of substantially spherical cushions, it is clear that the felly forms when moving inwardly between the opposite series of balls a wedge which is produced by the relatively convergent radially outer portions of the ball seats 13, the wedge action occurring by the inward movement of the felly structure against the interposed cushions against the opposed complementary seats 7. Conversely when the top of the felly moves upwardly from the hub, then the radially inner portion of the seats 13 assume the function of a wedge and moving outwardly press the cushioning members or balls 7 against the diametrically opposed portion of the seats 7. Subject matter herein disclosed but not claimed is made the subject of my divisional application filed June 17, 1918, Serial Number 240535.

What is claimed is:

1. A resilient wheel structure comprising concentric rings; annular side members held in spaced relation by said rings and having concave seats coördinate to seats in the wheel body and means for securing the side members to the rings; said seats adapted to receive an annular series of rubber balls to be compressed between the opposed seats.

2. A resilient wheel structure comprising a central body with flanges having lateral concentric, semi circular concave seats on their inner faces; annular side members between the said flanges and having concentric semi circular concave seats coördinate to the seat in the flanges; and annular series of rubber balls compressed between the opposed seats, and means for limiting rolling movement of the balls in their grooves.

3. A resilient wheel structure comprising a central hub body with flanges having lateral concave seats on their inner faces; annular side members held in spaced relation between the said flanges and having concave seats coördinate to the seats in the flanges; bolts for securing the side members; annular series of rubber balls compressed between the opposed seats, and means mounted on the bolts for limiting rolling movement of the balls in their grooves.

In testimony whereof I affix my signature.

WILLIAM G. CHIPLEY.